United States Patent

Nagai

[11] Patent Number: 5,698,850
[45] Date of Patent: Dec. 16, 1997

[54] METHOD OF DETECTING NONUNIFORMITY OF SENSITIVITY OF RADIATION DETECTOR

[75] Inventor: Yasuki Nagai, Tokyo, Japan

[73] Assignee: President of Tokyo Institute of Technology, Tokyo, Japan

[21] Appl. No.: 622,680

[22] Filed: Mar. 26, 1996

[30] Foreign Application Priority Data

Sep. 25, 1995 [JP] Japan ................................ 7-245648

[51] Int. Cl.⁶ ................................................. G01T 1/202
[52] U.S. Cl. ................................. 250/252.1; 250/362
[58] Field of Search .................... 250/252.1 R, 390.11, 250/362, 391, 369

[56] References Cited

U.S. PATENT DOCUMENTS 4,119,847 10/1978 Waggoner ................. 250/252.1 R

FOREIGN PATENT DOCUMENTS 766272 6/1982 U.S.S.R. ...................... 250/252.1 R

OTHER PUBLICATIONS

"The New BNL High–Energy Gamma–Ray Spectrometers", Nuclear Instruments and Methods in Physics Research 222, A.M. Sandorfi, et al., pp. 479–495, 1984. (p. 483).

Primary Examiner—Carolyn E. Fields
Attorney, Agent, or Firm—Oblon, Spivak, McClelland, Maier & Neustadt, P.C.

[57] ABSTRACT

Radiation made to enter an entire envelope formed of lead or copper, which is included in a radiation detector, results in generating neutrons. Then, the neutrons enter an NaI (Tl) crystal, a CsI crystal, a BiGeO crystal, a BaF$_2$ crystal, a GSO (Gd$_2$SiO$_5$) crystal or a GdO crystal, forming a scintillator portion of the radiation detector, and as a result, gamma rays are generated due to a neutron capture reaction. The energy of the gamma rays is measured, thereby detecting the nonuniformity of sensitivity of the scintillator portion of the radiation detector.

5 Claims, 1 Drawing Sheet

METHOD OF DETECTING NONUNIFORMITY OF SENSITIVITY OF RADIATION DETECTOR

BACKGROUND OF THE INVENTION

1. Field of the Invention

The present invention relates to a method of detecting the nonuniformity of sensitivity of a radiation detector, using incident radiation.

2. Description of the Related Art

As is known, a radiation detector such as a gamma-ray detector cannot detect radiation with a high precision, if its sensitivity is nonuniform, varying with the energies of radiations and the positions at which the radiations reach in the detector. When the sensitivity varies, the energy resolution of the detector decreases. A method has been proposed to detect the nonuniformity of sensitivity of a radiation detector in advance, by scanning the detector with monochromatic gamma rays.

The method can detect but only the nonuniformity of sensitivity at the surface of the detector. Inevitably, the method cannot detect the nonuniformity of sensitivity of the entire detector with a sufficiently high accuracy. For example, the nonuniformity of sensitivity which a cylindrical NaI (Tl) radiation detector commercially available exhibits in its axial direction is detected by applying standard gamma rays having energy of 0.662 MeV and standard gamma rays having energy of 6.13 MeV to the detector. This method can detect the nonuniformity of sensitivity of the detector, but with an error of 2% or thereabout. The nonuniformity of sensitivity detected is still inaccurate. Therefore, it is demanded that a method be developed which can detect the nonuniformity of sensitivity of a radiation detector with higher accuracy.

SUMMARY OF THE INVENTION

The object of the present invention is to provide a method for detecting the nonuniformity of sensitivity of a radiation detector with high accuracy.

In the method of the present invention, gamma rays are generated from the radiation entering a scintillator of a radiation detector, and the energy of the gamma rays is measured, thereby detecting the nonuniformity of sensitivity of the radiation detector. The method is characterized in that radiation including neutrons is made to enter the scintillator from almost all outer periphery of the scintillator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

Figure 1:
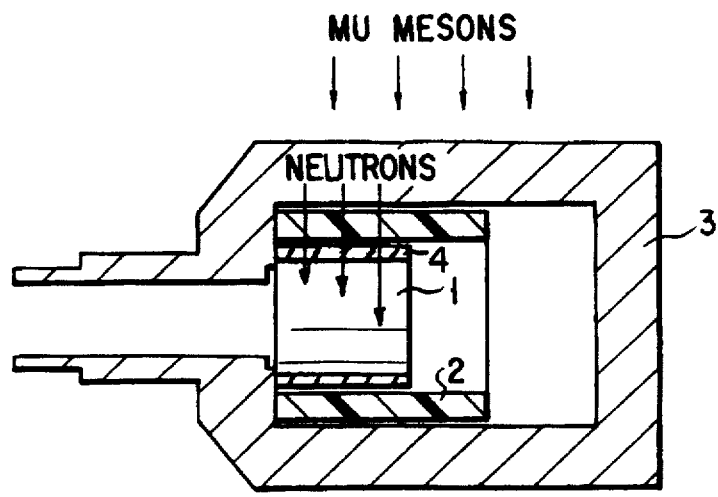
FIG. 1 is a cross sectional view schematically showing a NaI (Tl) detector.

The following are explanations of an example of a radiation detector for use in a method according to an embodiment of the present invention, for detecting the nonuniformity of sensitivity of the radiation detector, the explanation being given with reference to FIG. 1:

In FIG. 1, reference number 1 denotes a solid-cylindrical NaI (Tl) crystal which is a scintillator. A reflection film 4 for gamma rays, such as an MgO film, is formed on the entire outer periphery of the crystal 1. The crystal 1 is received into a hollow-crystal plastic member 2. The plastic member 2 including the crystal 1 is sealed in an envelope 3, and shielded from gamma rays from the outside.

The following are examples of the dimensions of the structural members of the detector having the above structure:

The diameter of the NaI (Tl) crystal is 9 inches (about 22.86 cm), the length thereof is 8 inches (about 20.32 cm), the thickness of the plastic member 2 is 2 inches (about 5.08 cm), the length thereof is 12.2 inches (about 30.48 cm), and the thickness of the envelope 3 is 4 inches (about 10.16 cm).

The method for detecting the nonuniformity of sensitivity of the above detector will be explained as follows:

First of all, mu mesons included in cosmic rays are made to enter the detector mainly from the outer periphery of the detector. As a result, the mu mesons are captured by lead of which the envelope 3 is formed, and as a result, neutrons generate from the lead. The neutrons pass through the plastic member 2, with the velocity of the neutrons gradually decreased by the plastic member 2, and then enter the NaI (Tl) crystal 1. At this time, the neutrons reach throughout the entire crystal 1, since mu mesons are substantially evenly included in cosmic rays. Thus, throughout the crystal 1, the neutrons are captured by iodine (I) of the NaI (Tl), and gamma rays characteristic of the iodine (I) radiate. In other words, this "neutron capture reaction" occurs throughout the entire crystal 1 (all range in radial and axial directions). The gamma rays generating in the above manner generate photoelectrons in all range, the amount of which corresponds to the energy of the gamma rays, and then the photoelectrons enter a photoelectric tube, and are converted into electric signals. Consequently, the nonuniformity of sensitivity of the detector in the entire area can be detected, since gamma rays generate throughout the entire crystal 1.

The following is a result of the nonuniformity of sensitivity of the detector which is detected by the above method: gamma rays having energy of 6.826 MeV are measured as having energy of 6.944 MeV. In other words, the error with which the nonuniformity of sensitivity is detected is reduced to following percentage:

$$(6.944-6.826)/6.826 = 1.7\% \ (\pm 0.85)$$

Therefore, in the method of the present invention, the cubic volume (all area) of the detector which cannot be detected by the conventional method can be detected, and further the nonuniformity of sensitivity is detected with higher accuracy than in the conventional method.

Figure 2:
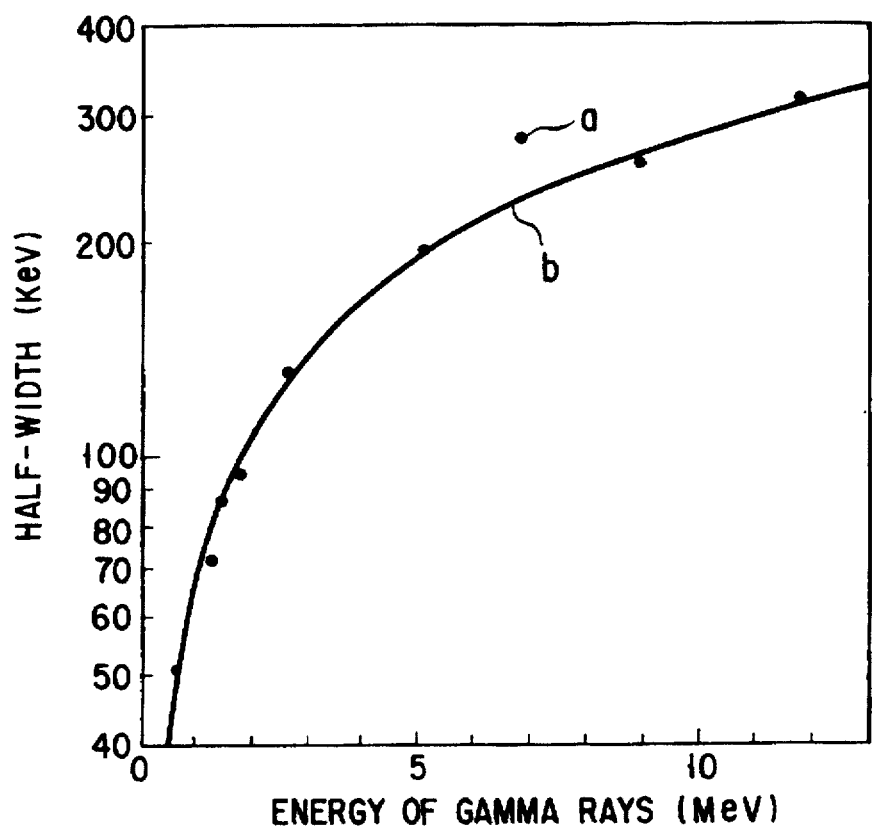
FIG. 2 is a graph showing a relationship between the measured energy and half-width of gamma rays.

The half-width of the energy of the gamma rays having energy of 6.944 MeV is 0.280 MeV which is indicated by a point a of FIG. 2, and greater than the half-width of the peak of standard gamma rays, i.e. 0.235 MeV, which is indicated by a point b of FIG. 2, and obtained from a calibration curve thereof. It is understood from this fact also that the nonuniformity of sensitivity of the detector has an effect on the half-width.

As explained above, in the present invention, neutrons are made to enter substantially the entire scintillator, as a result of which gamma rays characteristic of the nuclide of a material, of which the scintillator is formed, generate throughout the scintillator, and then the gamma rays are measured, thereby detecting the nonuniformity of sensitivity of the detector.

In the above embodiment, the scintillator is formed of NaI (Tl). However, the method of the present invention does not limit the material of the scintillator to NaI (Tl). In other words, any material can be used, if it can capture neutrons to radiate gamma rays, as CsI, BiGeO, $BaF_2$, GSO ($Gd_2SiO_5$) and GdO, etc.

Furthermore, in the embodiment, mu mesons are made to enter the envelope which is formed of lead, and then captured by the lead. As a result, neutrons generate from the lead. However, besides such a manner, radiation differing from the above radiation may be made to enter an envelope formed of a neutron radiation material such as copper, or neutrons may be made to directly enter the scintillator without passing through the envelope.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of detecting nonuniformity of sensitivity of a scintillator portion of a radiation detector, comprising:

causing radiation to enter an outer periphery of the radiation detector to generate neutrons;

causing the neutrons to enter the scintillator portion from substantially all of an outer periphery of the scintillator portion; and detecting the nonuniformity of the sensitivity of the scintillator portion by measuring the energy of gamma rays generated due to a neutron captive reaction in the scintillator portion.

2. The method according to claim 1, wherein the scintillator includes a gamma ray reflection film formed on the outer periphery of the scintillator.

3. The method according to claim 2, wherein the scintillator is surrounded by a plastic member, and the plastic member is sealed in a gamma ray shield envelope.

4. The method according to claim 3, wherein the gamma-ray shield envelope is formed of a material which is capable of capturing mu mesons to generate neutrons.

5. The method according to claim 1, wherein the scintillator is formed of a crystal of one of NaI, CsI, BiGeO, $BaF_2$, $Gd_2SiO_5$ and GdO.

* * * * *